United States Patent
Amm et al.

(10) Patent No.: US 9,639,187 B2
(45) Date of Patent: May 2, 2017

(54) USING VIBRATION TO DETERMINE THE MOTION OF AN INPUT DEVICE

(75) Inventors: David T. Amm, Sunnyvale, CA (US); Omar S. Leung, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1240 days.

(21) Appl. No.: 12/235,326

(22) Filed: Sep. 22, 2008

(65) Prior Publication Data
US 2010/0073292 A1    Mar. 25, 2010

(51) Int. Cl.
*G06F 3/033*    (2013.01)
*G06F 3/038*    (2013.01)
*G06F 3/0354*    (2013.01)

(52) U.S. Cl.
CPC ........ *G06F 3/0383* (2013.01); *G06F 3/03543* (2013.01)

(58) Field of Classification Search
CPC ........................................................ G06F 3/033
USPC ................................................. 345/156–184
See application file for complete search history.

(56) References Cited

U.S. PATENT DOCUMENTS

| | | | |
|---|---|---|---|
| 4,514,726 A * | 4/1985 | Whetstone et al. | 345/163 |
| 4,550,316 A * | 10/1985 | Whetstone | G06F 3/03543 250/221 |
| 4,699,006 A | 10/1987 | Boxenhorn | |
| 4,930,351 A | 6/1990 | Macy et al. | |
| 5,191,641 A | 3/1993 | Yamamoto et al. | |
| 5,195,179 A | 3/1993 | Tokunaga | |
| 5,508,719 A | 4/1996 | Gervais | |
| 5,661,502 A * | 8/1997 | Cheng | 345/159 |
| 5,775,935 A | 7/1998 | Barna | |
| 5,805,137 A | 9/1998 | Yasutake | |
| 5,999,169 A | 12/1999 | Lee | |
| 6,184,865 B1 | 2/2001 | Zimmerman et al. | |
| 6,489,948 B1 | 12/2002 | Lau | |
| 6,515,651 B1 | 2/2003 | Berstis | |
| 6,693,625 B2 | 2/2004 | Armstrong | |
| 6,894,678 B2 | 5/2005 | Rosenberg et al. | |
| 6,975,302 B1 | 12/2005 | Ausbeck, Jr. | |
| 7,075,527 B2 | 7/2006 | Takagi et al. | |
| 7,154,477 B1 | 12/2006 | Hotelling et al. | |
| 7,176,889 B2 | 2/2007 | Baker et al. | |
| 7,267,585 B2 | 9/2007 | Wilk | |
| 7,311,526 B2 | 12/2007 | Rohrbach et al. | |
| 7,351,066 B2 | 4/2008 | DiFonzo et al. | |

(Continued)

FOREIGN PATENT DOCUMENTS

| | | |
|---|---|---|
| KR | 20070118370 | 12/2007 |
| WO | WO-2010033256 A2 | 3/2010 |
| WO | WO-2010033256 A3 | 11/2010 |

OTHER PUBLICATIONS

"International Application Serial No. PCT/US2009/005267, Search Report mailed Sep. 30, 2010", 7 pgs.

(Continued)

*Primary Examiner* — Nicholas Lee
*Assistant Examiner* — Sepideh Ghafari
(74) *Attorney, Agent, or Firm* — Fish & Richardson P.C.

(57) ABSTRACT

A method and apparatus for determining the speed and/or position of an input device from vibrational signals is disclosed herein. In one embodiment, a response spectrum is generated as the input device moves across a surface. Amplitude and frequency data associated with the response spectrum is analyzed to determine the magnitude of the velocity.

28 Claims, 6 Drawing Sheets

(56) References Cited

U.S. PATENT DOCUMENTS

| | | | |
|---|---|---|---|
| 7,493,220 B2* | 2/2009 | Leigh et al. .................... 702/56 |
| 7,999,797 B2* | 8/2011 | Edpalm et al. ............... 345/177 |
| 9,041,650 B2 | 5/2015 | Amm et al. |
| 2001/0045941 A1* | 11/2001 | Rosenberg et al. ........... 345/161 |
| 2003/0067440 A1* | 4/2003 | Rank ....................... G06F 3/016 345/156 |
| 2004/0017355 A1 | 1/2004 | Shim |
| 2004/0080494 A1 | 4/2004 | Fahlman |
| 2004/0130532 A1 | 7/2004 | Gordon et al. |
| 2005/0024332 A1 | 2/2005 | Chen |
| 2005/0110745 A1 | 5/2005 | Rutledge et al. |
| 2005/0134556 A1 | 6/2005 | VanWiggeren et al. |
| 2006/0274042 A1 | 12/2006 | Krah et al. |
| 2007/0080940 A1 | 4/2007 | Aoki et al. |
| 2007/0146325 A1 | 6/2007 | Poston et al. |
| 2007/0290998 A1 | 12/2007 | Choi et al. |
| 2007/0298877 A1* | 12/2007 | Rosenberg ..................... 463/30 |
| 2008/0159738 A1 | 7/2008 | Lavranchuk |
| 2008/0167832 A1 | 7/2008 | Soss |
| 2009/0278798 A1* | 11/2009 | Kim et al. .................... 345/158 |
| 2010/0013768 A1 | 1/2010 | Leung |
| 2010/0066669 A1 | 3/2010 | Amm et al. |
| 2010/0066670 A1 | 3/2010 | Amm et al. |
| 2010/0207746 A1* | 8/2010 | Song ................... G06F 3/03543 340/407.2 |

OTHER PUBLICATIONS

"International Application Serial No. PCT/US2009/005267, Written Opinion mailed Sep. 30, 2010", 6 pgs.

U.S. Appl. No. 12/233,478, filed Sep. 18, 2008.

U.S. Appl. No. 12/233,502, filed Sep. 18, 2008.

Hinckley et al., "Quantitative Analysis of Scrolling Techniques"—CHI 2002 Conf. on Human Factors in Computing Systems, pp. 65-72. (CHI Letters, vol. 4, No. 1).

* cited by examiner

USING VIBRATION TO DETERMINE THE MOTION OF AN INPUT DEVICE

FIELD OF THE INVENTION

The present invention relates generally to the field of data input. More particularly, the present invention is directed in one exemplary aspect to determining the speed and/or position of an input device based on one or more response signals.

DESCRIPTION OF RELATED TECHNOLOGY

In principle, an inertial device can be used as an input source for a computing device. For example, an inertial input device comprising an accelerometer can measure the acceleration of the input device and thereafter calculate an estimated velocity and/or position of the input device based upon the measured acceleration. Such estimated velocity and/or position data can then be provided to one or more requesting applications.

However, a number of adverse effects have prevented the production of a workable accelerometer-based input device. Some problems associated with an accelerometer-based input device are cursor drift and kickback errors in tracking the motion of the input device. For example, after a consecutive number of calculations, errors in accelerometer readings, offsets, or noise, for example, can cause the resulting calculated velocity of the input device to be incorrect. This can cause a cursor to continue moving even though the input device is stationary.

Certain changes in the orientation of the input device also tend to yield undesirable effects. This is because accelerometers cannot distinguish between acceleration due to gravity and acceleration due to dynamic motion. While an acceleration offset typically compensates for the effects of gravity, a problem arises when the accelerometer changes its orientation with respect to the direction of the offset (e.g., if the input device is placed upon a non-horizontal or non-flat surface). Since the change in offset due to gravity cannot be separated from dynamic motion, the offset becomes unknown, and incorrect and unstable velocities often result.

Additionally, while an accelerometer driven input device performs well at high speeds, its performance declines substantially at lower speeds where the acceleration values are close to the measurable limits of the device.

What is needed is a means or mechanism for addressing each of the aforementioned concerns. More specifically, methods and apparatus are needed for implementing an accelerometer-based input device without significant tracking errors. Ideally, the method and apparatus would account for changes in the orientation of the input device while retaining desirable performance characteristics at lower speeds.

SUMMARY OF THE INVENTION

The present invention addresses the foregoing needs by disclosing various apparatus and methods for using vibration to determine the speed of a motion-based input device.

In a first aspect of the invention, an input device is disclosed. In one embodiment, the input device comprises: a first module for detecting vibrations as the input device is moved across a surface; and a second module for estimating a speed of the input device based on the detected vibrations.

In a second aspect of the invention, a method of tracking a motion of an input device is disclosed. In one embodiment, the method comprises: estimating a velocity of the input device based upon a first set of data and a second set of data; and positioning a display object based at least in part upon said velocity, wherein the first set of data is based at least in part upon a sensory value, and wherein the second set of data is based at least in part upon vibrations associated with the input device moving across a surface.

In a third aspect of the invention, a computer readable medium storing computer executable instructions is disclosed. In one embodiment, the instructions are adapted to perform a process comprising: receiving a signal generated by a vibration sensor indicative of contact with a surface; and determining a speed of the input device based in part upon the signal.

In a fourth aspect of the invention, a system is disclosed. In one embodiment, the system comprises: an input device adapted to interact with a surface; a computing device adapted to receive a signal from the input device; and a graphical object adapted to respond to a command issued by the computing device, wherein the signal comprises a value that is based in part upon a vibration induced by the input device moving upon a surface.

DETAILED DESCRIPTION OF EXEMPLARY EMBODIMENTS

Figure 1:
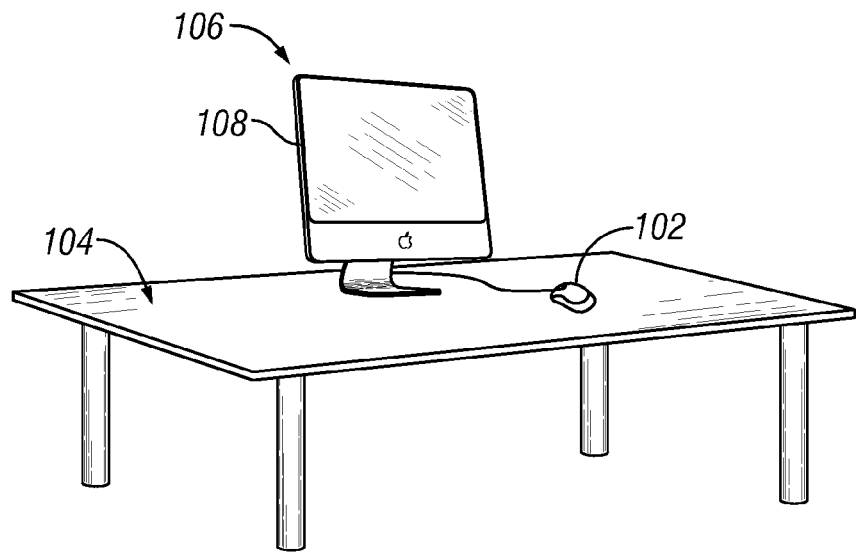
FIG. 1 is a block diagram illustrating a typical environment in which an input device may be used according to one embodiment of the present invention.

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

As used herein, the term "application" includes without limitation any unit of executable software which implements a specific functionality or theme. The unit of executable software may run in a predetermined environment; for example, a downloadable Java Xlet™ that runs within the JavaTV™ environment.

As used herein, the terms "computer program" and "software" include without limitation any sequence of human or machine cognizable steps that are adapted to be processed by a computer. Such may be rendered in any programming language or environment including, for example, C/C++, Fortran, COBOL, PASCAL, Perl, Prolog, Python, Matlab, assembly language, scripting languages, markup languages (e.g., HTML, SGML, XML, VoXML), functional languages (e.g., APL, Erlang, Haskell, Lisp, ML, F# and Scheme), as well as object-oriented environments such as the Common Object Request Broker Architecture (CORBA), Java™ (including J2ME, Java Beans, etc.).

As used herein, the term "display" includes any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices also include less dynamic devices such as printers, e-ink devices, and other similar structures.

As used herein, the term "interface" refers to any signal or data interface with a component or network including, without limitation, those compliant with USB (e.g., USB2), FireWire (e.g., IEEE 1394b), Ethernet (e.g., 10/100, 10/100/1000 Gigabit Ethernet, 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a,b,g,n), WiMAX (802.16), PAN (802.15), or IrDA families.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As user herein, the term "module" refers to any unit or combination of units incorporating software, firmware, hardware, or any combination thereof that is designed and configured to perform a desired function.

As used herein, the terms "processor," "microprocessor," and "digital processor" include all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, and application-specific integrated circuits (ASICs). Such processors may be contained on a single unitary IC die or distributed across multiple components.

As used herein, the terms "receiving device" and "receiver" include without limitation video game consoles, set-top boxes, televisions, personal computers (whether desktop, laptop, or otherwise), digital video recorders, communications equipment, terminals, and display devices.

As used herein, the term "wireless" refers to any wireless signal, data, communication, or other interface including, without limitation, Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

FIG. 1 is a block diagram illustrating a typical environment in which an input device 102 may be used according to one embodiment of the present invention. The input device 102 is initially positioned upon a surface 104 such as a desk or a tabletop. In order to generate input data, a user manipulates the input device relative to the surface 104.

Note that in FIG. 1, the surface 104 is depicted as being flat or substantially flat; however, a flat surface 104 is not strictly necessary according to embodiments of the present invention. Also note that in some embodiments, the surface 104 need not necessarily be situated beneath the input device 102. For example, the surface 104 may be tilted, above the input device 102, or vertically oriented. Also note that in certain embodiments, multiple surfaces 104 may be utilized.

A receiving device (such as the depicted computer 106) is adapted to receive input data generated from the input device 102. In some embodiments, the receiving device comprises at least one network interface adapted to receive the generated data. The input device 102 may connect to the receiving device over a wireless or wired communication link (such as a serial bus cable or other physical connector).

The receiving device is adapted to display a navigational object (for example, a pointer, cursor, selector box, or other such indicator) upon its display screen 108. During operation, when the user manipulates the input device 102 relative to the surface 104, the input signals are received at the computer 106 and the navigational object responds according to the user's input. It is understood that the receiving device can be any type of computing device having a display such as an iMac™ computer or a personal computer having a separate display monitor, for example. Other types of computing devices having displays for displaying navigational objects would be readily apparent to those of ordinary skill in the art.

In other embodiments, the input data is used for purposes other than for orienting a navigational object on a display screen. For instance, in some embodiments (as may be implemented in certain video games and/or graphical applications), the speed of the input device 102 is calculated, but not its direction. In one application, the color of a display screen 108 is predicated upon how fast the input device 102 is moving. For example, moving the input device 102 at a first speed may generate a red color, while moving the input device 102 at a second speed may generate a blue color.

Figure 2:
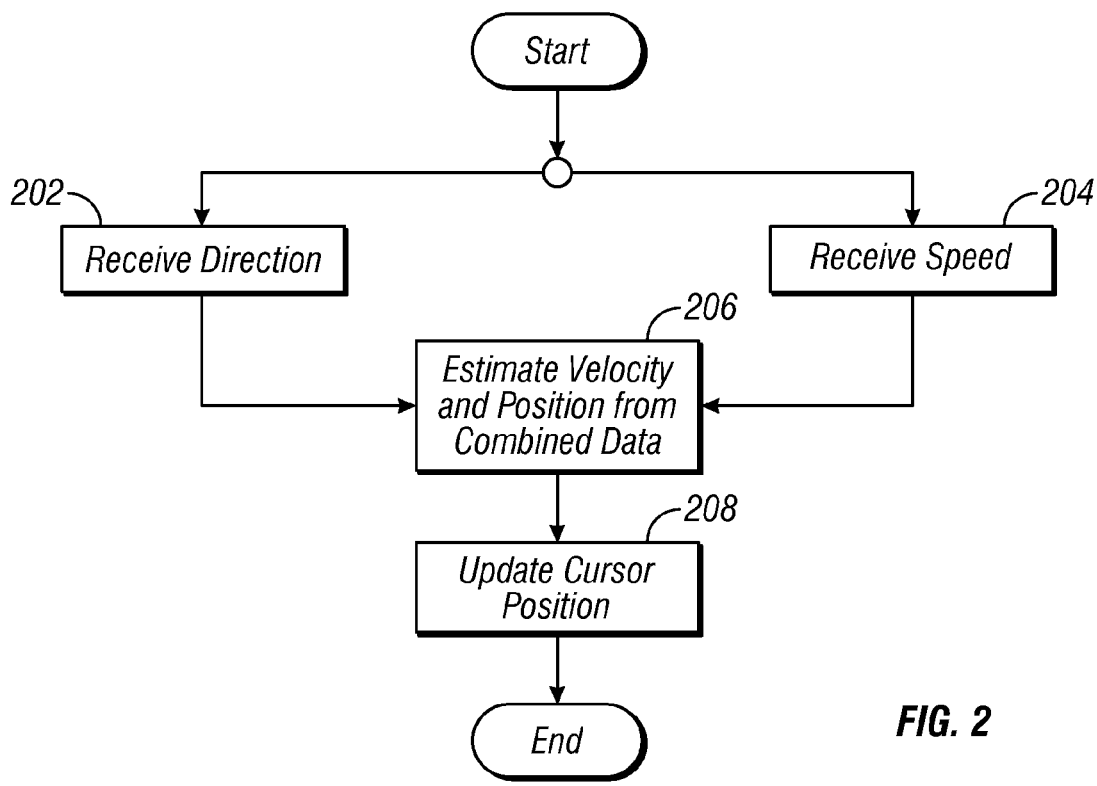
FIG. 2 is a flow diagram illustrating a high level method of updating cursor position according to one embodiment of the present invention.

FIG. 2 is a high-level flow diagram illustrating a method of updating cursor position according to one embodiment of the present invention. Cursor position is updated based upon motion of the input device 102, where the motion comprises both a direction and a speed. At step 202, the direction of motion is received. At step 204, a speed of motion is received. Once both speed and direction have been received, the velocity and/or position of the input device are calculated at step 206. Based upon the velocity and/or positional data, cursor position may then be updated at step 208.

Figure 3:
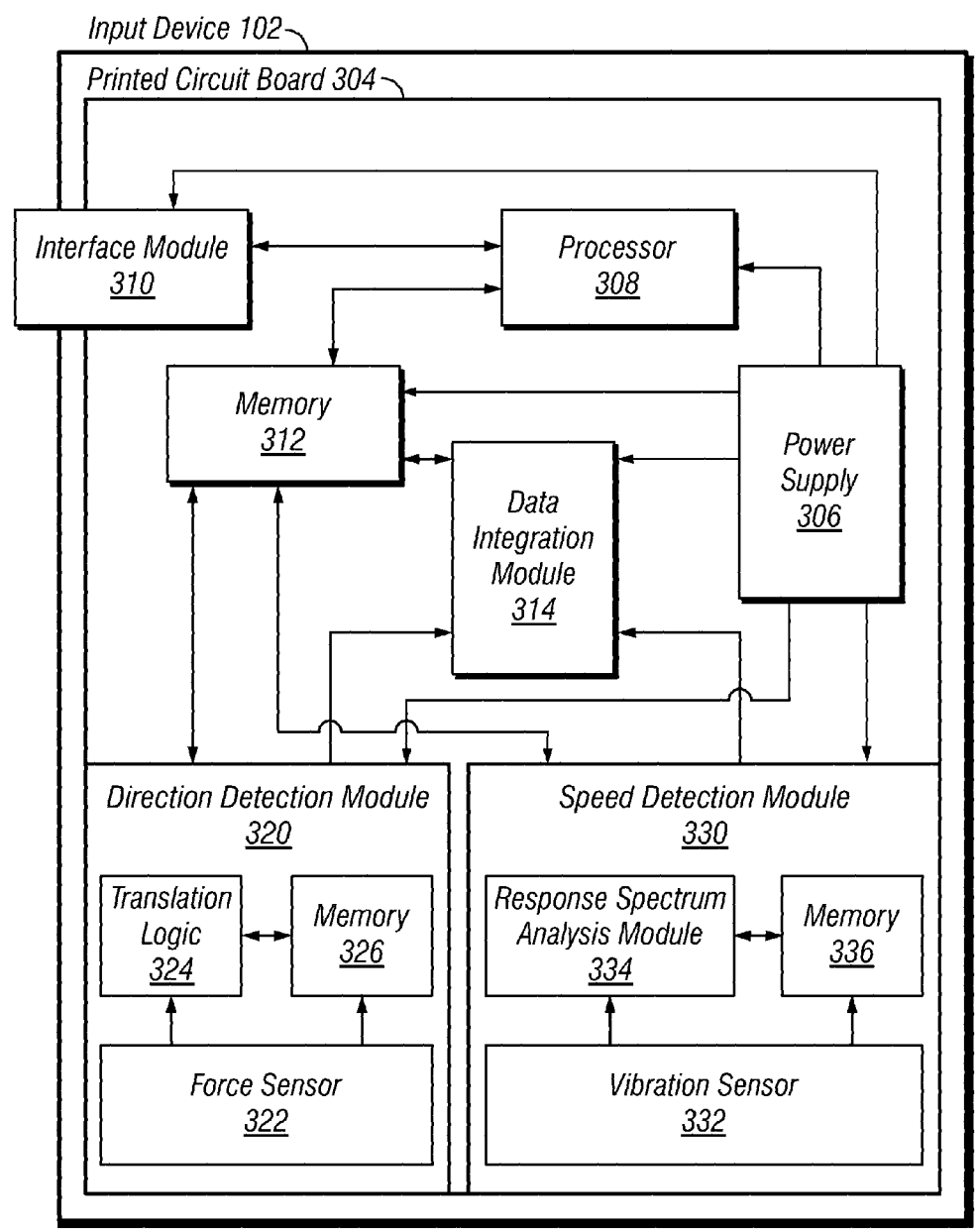
FIG. 3 is a system diagram of a modular arrangement of an input device according to one embodiment of the present invention.

FIG. 3 is a system diagram of a modular arrangement of the input device 102 according to one embodiment of the present invention. The input device 102 houses a printed circuit board 304 enabling communication and data transfer between the connected modules.

A power supply 306 provides a source of power to modules electrically connected to the printed circuit board 304. In some embodiments, power is supplied externally by one or more conductive wires, for example, from a power cable or a serial bus cable. In other embodiments, a battery may be used as a source of power.

A memory 312 comprises any type of module adapted to enable digital information to be stored, retained, and retrieved. Additionally, the memory 312 may comprise any combination of volatile and non-volatile storage devices, including without limitation RAM, DRAM, SRAM, ROM, and/or flash memory. Note also that the memory 312 may be organized in any number of architectural configurations utilizing, for example, registers, memory caches, data buffers, main memory, mass storage, and/or removable media.

One or more processors 308 are adapted to execute sequences of instructions by loading and storing data to the memory 312. Possible instructions include, without limitation, instructions for data conversions, formatting operations, communication instructions, and/or storage and retrieval operations. Additionally, the processors 308 may comprise any type of digital processing devices including, for example, reduced instruction set computer processors, general-purpose processors, microprocessors, digital signal processors, gate arrays, programmable logic devices, reconfigurable compute fabrics, array processors, and/or application-specific integrated circuits. Note also that the processors 308 may be contained on a single unitary IC die or distributed across multiple components.

An interface module 310 enables data to be transmitted and/or received between two or more devices. In one embodiment, data transmitted to a receiving device is first packetized and processed according to one or more standardized network protocols. The interface module 310 may accommodate any wired or wireless protocol including, without limitation, USB, FireWire, Ethernet, Gigabit Ethernet, MoCA, radio frequency tuners, modems, WiFi, Bluetooth, WiMax, and/or Infrared Data Association.

A direction detection module 320 comprises logic adapted to determine the direction of the velocity of the input device 102 during a given instant, or alternatively, over a given period of time. In some embodiments, the direction detection module 320 comprises a force sensor 322 adapted to sense external forces acting upon the input device 102. In one embodiment, the force sensor 322 may be adapted to measure a vertical force exerted upon the input device 102, as described in more detail in Applicant's U.S. patent application Ser. No. 12/233,478 filed on Sep. 19, 2008, and titled "Using Measuring Lateral Force for Tracking an Input Device",the content of which is incorporated by reference herein in its entirety for all purposes. In another embodiment, the force sensor may be adapted to finely track control of a mouse cursor, as described in more detail in Applicant's U.S. patent application Ser. No. 12/233,502,filed on Sep. 18, 2008, and titled "Force Sensing for Fine Tracking Control of Mouse Cursor", the content of which is also incorporated by reference herein in its entirety for all purposes.

After a force value has been detected, a translation logic module 324 (which may be implemented as any combination of software, firmware, and/or hardware according the scope of the present invention) can determine the direction of the velocity of the input device 102 from the input force value. Note that in some embodiments, a force value indicated by the force sensor 322 is written to a local memory source 326 (such as a register or local cache) before being provided as input to the translation logic module 324. In other embodiments, this data is directly written and retrieved from the memory 312. In still other embodiments, this data is stored in external memory (e.g. a hard drive of the computer 106) and the input device transmits raw data to the computer 106 for processing.

Note also that even though FIG. 3 depicts the translation logic module 324 as being disposed within the direction detection module 320, this is not strictly necessary according to some embodiments of the present invention. Additionally, according to some embodiments, one or more separate modules comprise at least a portion of the logic necessary to derive the direction of the velocity of the input device 102 from a detected force value. For example, in one embodiment, the force sensor 322 provides raw data (e.g., a detected force value) to a data integration module 314, and the data integration module 314 comprises logic necessary for determining the direction of the velocity of the input device 102 from the detected force value.

The input device 102 also comprises a speed detection module 330 adapted to detect vibrational "sliding noise" resulting from the input device 102 moving across a surface 104. In some embodiments, when the input device 102 slides across a surface 104, the speed detection module 330 records signaling data from one or more vibration response spectrums. The speed of the input device 102 can be estimated based upon the specific vibration response detected since the speed of the input device 102 monotonically increases with the amplitude of the vibration response. In other words, there is a one-to-one relationship between vibrational energy and speed.

According to some embodiments, the speed detection module 330 comprises a vibration sensor 332 adapted to detect vibrational signals resulting from surface contact. In one embodiment, the vibration sensor 332 comprises an accelerometer. Note, however, that other means of vibration detection may also be utilized according to the scope of the present invention. This includes, for example, force sensors and/or microphones. In some embodiments, mechanical structures (e.g., resonant structures) are utilized in order to enhance the sensitivity to sliding vibration.

As the input device 102 slides across a surface 104, the speed detection module 330 records attendant vibrational signals. Note that a given signal may be the result of several components: gravity, dynamic motion (about the XY plane), pressure (about the Z plane), frictional characteristics, vibration, external noise, and technological artifacts (for example, non-ideal accelerometer artifacts). Various embodiments of the present invention therefore utilize a number of methods for extracting dynamic motion from a given signal.

According to some embodiments, a response spectrum analysis module 334 initially executes one or more normalization sequences based upon a set of externally provided data (e.g., sensed data). The normalization sequences control for variable conditions exhibited within the surrounding environment or from the input device 102 itself.

In some embodiments, normalization accounts for varying effects of friction (both static and kinetic). As the input device 102 slides across a surface 104, the friction acting upon it will largely depend upon the type of surface it is contacting (e.g., wood, glass, marble, plastic, metal, padding, etc.). Frictional coefficients associated with contacting region(s) of the input device 102 may also vary across models and/or housing materials.

Figure 4:
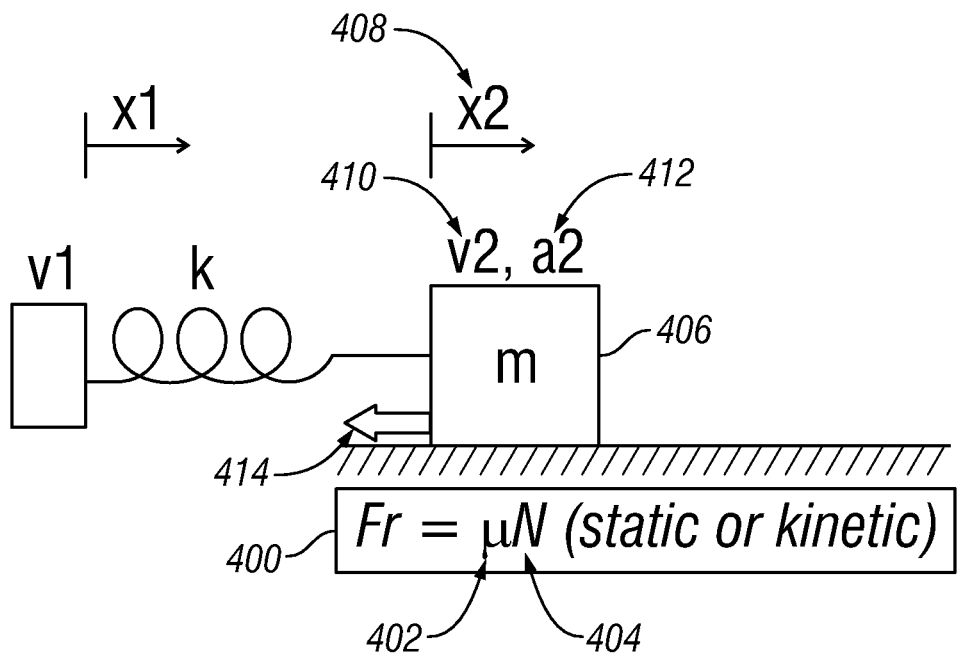
FIG. 4 is a block diagram of an initial model for sliding friction according to one embodiment of the present invention.

An initial model for sliding friction is shown in FIG. 4. According to some embodiments, friction comprises the product of a frictional coefficient, $\mu$ 402 and a normal force N 404 exerting between contacting surfaces. This relationship is expressed in equation 400. The direction of a frictional force opposes the direction of an applied force. Thus, as Mass m 406 moves in the direction designated by x2 408 with a velocity v2 410 and acceleration a2 412, a frictional force will oppose this motion in the direction indicated by the vector 414.

An input device 102 sliding across a surface 104 will experience similar frictional forces. Thus, according to some embodiments of the present invention, frictional forces are initially discovered and subsequently normalized by one or more calibration sequences. In one embodiment, the input device 102 "learns" about the surface 104 during the first few seconds of operation. In some embodiments, the calibration process includes a predetermined sequence of user interactions with the input device 102 upon the surface 104.

Various other effects may also be normalized according to embodiments of the present invention. These include, for example, the magnitude of the z-force presently acting upon the input device 102. Experimental evidence has demonstrated that vibration intensity increases with increasing z-directional pressure applied to an input device 102. However, since frictional force is proportional to normal force (as described in equation 400), this relationship can therefore be utilized in order to control for the z-directional pressure. Normalizing the vibration intensity removes the dependence of vibration amplitude, and thereby decreases the variability of the calculated velocity. Note that according to some embodiments, the applicable z-force is measured directly with a load cell or other sensor.

Referring again to FIG. 3, after preliminary adjustments have been calculated (e.g., normalizing for friction and/or z-directional pressure), the response spectrum analysis module 334 estimates the speed and/or position of the input device 102 from one or more provided signals. These estimates are possible since the relative amplitude and frequency of a given vibrational signal is proportional to the speed of the input device 102.

In certain embodiments (particularly those embodiments where cursor tracking is not required), determining direction is not required. In these embodiments, the high frequency component of a response spectrum is initially extracted, and motion is then distinguished from static position by applying one or more thresholds to the extracted data.

In embodiments where the actual magnitude and direction of the velocity is required, a number of additional techniques may be utilized. Note that the following techniques are exemplary in nature and do not represent an exhaustive list of all techniques which can be employed in accordance with the scope of the present invention. Additionally, any of the following techniques can be used in conjunction with other techniques.

According to some embodiments, one or more force sensors 322 are utilized in order to calculate the direction of the velocity. In some embodiments, a two-dimensional force sensor 322 measures the sliding (i.e. frictional) force of the input device upon a surface 104. The unit vectors calculated from the X and Y forces then yield the vector direction of movement. In other embodiments, one or more sensors determine direction without measuring force.

Figure 5:
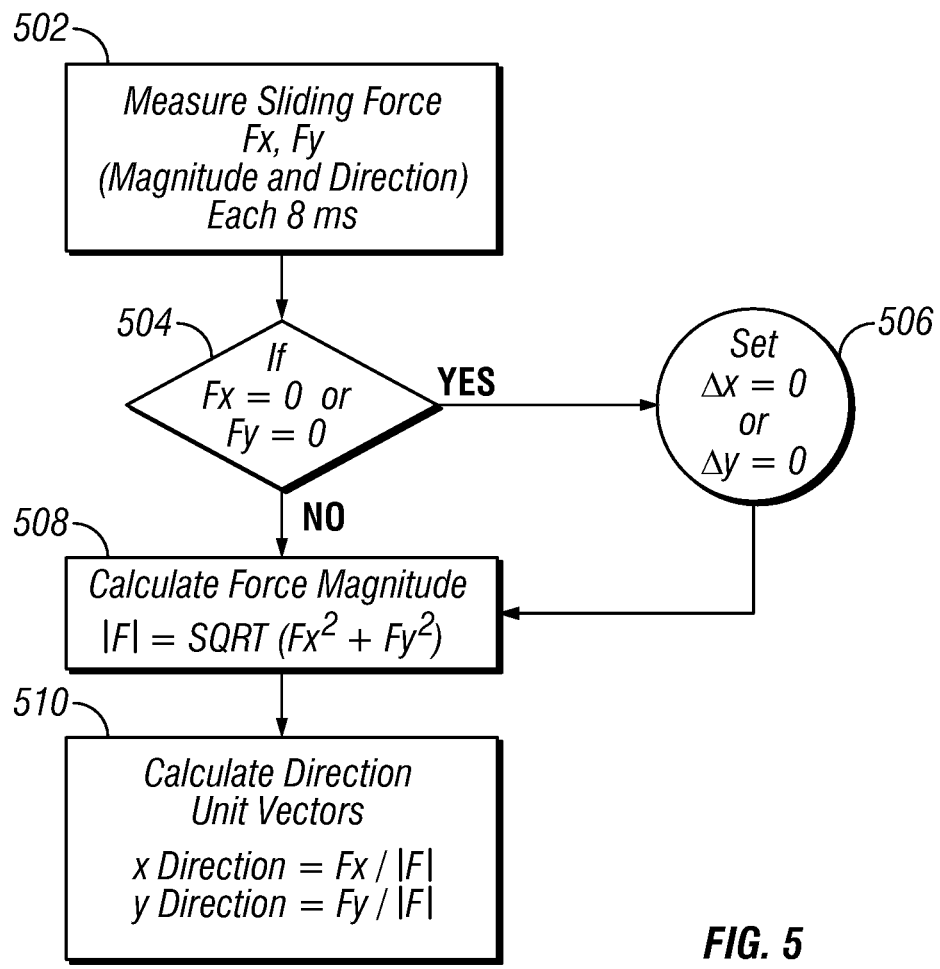
FIG. 5 is a flow diagram illustrating a method of calculating the direction of a dynamic force according to one embodiment of the present invention.

FIG. 5 is a flow diagram illustrating a method of calculating the direction of a dynamic force according to one embodiment of the present invention. At step 502, the frictional force (both magnitude and direction) is determined for both the x and the y axes. At decision block 504, if the magnitude of the force in either direction is equal to zero, the corresponding change in position will be set to zero at step 506. Otherwise, the magnitude of the combined force is calculated at step 508. In some embodiments, this value is given as:

$$|F| = \sqrt{(Fx^2 + Fy^2)}$$

After this value has been calculated, the corresponding unit vectors are derived at step 510. According to some embodiments, the respective unit vectors are defined as:

$$X \text{ direction} = Fx/|F|, \quad Y \text{ direction} = Fy/|F|$$

The magnitude of the velocity can then be measured by analyzing a high frequency component of a vibrational response spectrum since vibrational energy is proportional to speed.

Figure 6:
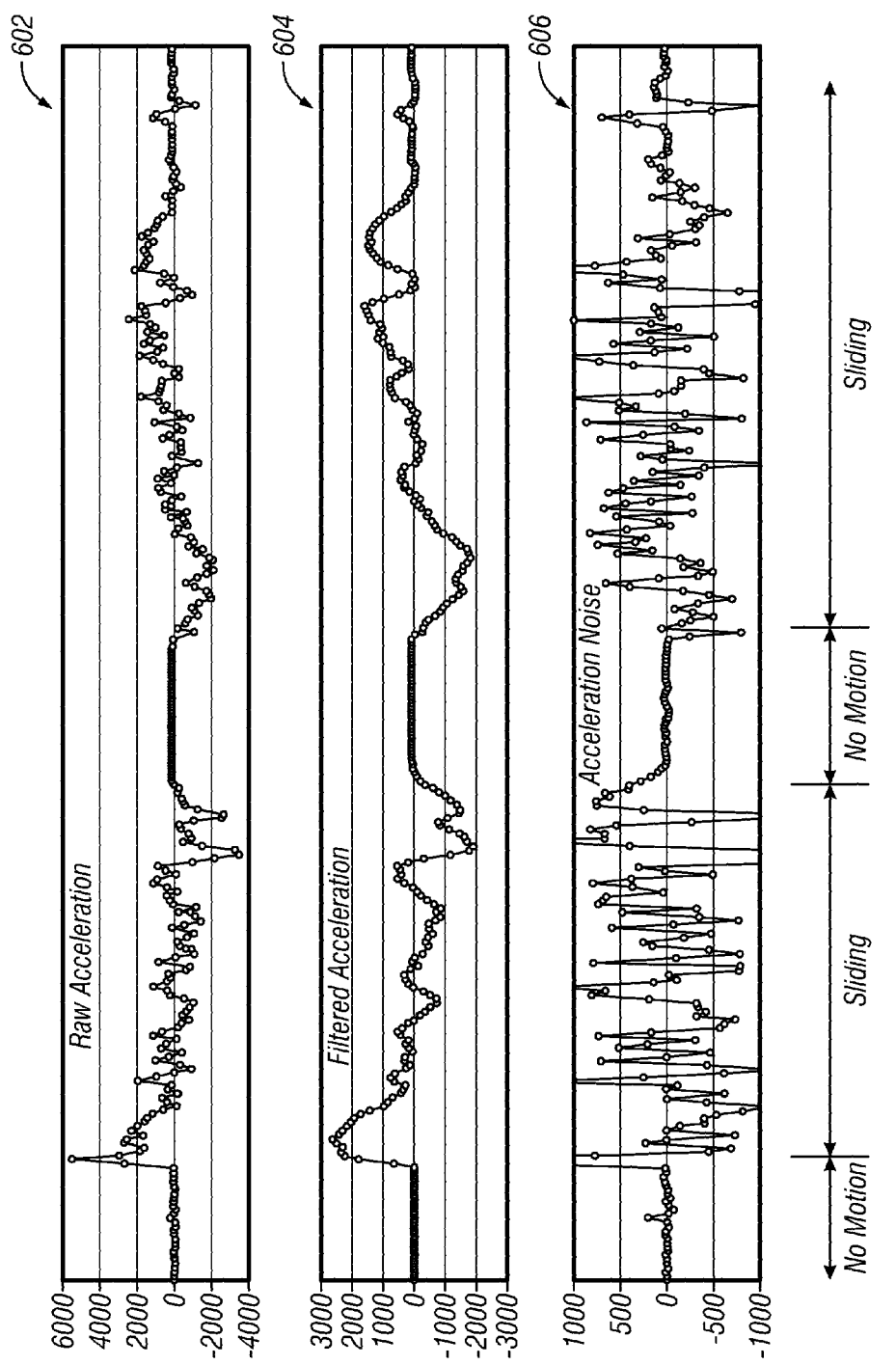
FIG. 6 is set of graphs illustrating an exemplary functional transformation of a set of inputs according to one embodiment of the present invention.

FIG. 6 is a set of graphs illustrating raw acceleration, filtered acceleration, and acceleration noise generated from a motion sequence of an input device 102. The data points illustrated in the raw acceleration graph 602 were collected from a micro-electromechanical accelerometer disposed within the input device 102. The filtered acceleration graph 604 illustrates the results of applying a low pass filter to the raw acceleration signal depicted in the raw acceleration graph 602. The acceleration noise graph 606 illustrates the high frequency component of the same signal. In conventional input devices, this high frequency component is typically discarded.

However, as evidenced by the figure, the intensity of the high frequency component correlates with sliding motion. As depicted in graph 606, the amplitude of the high frequency component is large when movement occurs, and is almost zero when no motion occurs. As such, this high frequency component may be analyzed in order to determine the speed of the input device 102.

Any number of techniques may then be utilized to determine the speed of the input device 102 according to embodiments of the present invention. For example, in some embodiments, the magnitude of the velocity is determined by counting the number of vibrational spikes detected during a given interval. In this respect, one or more thresholds may be used for the purpose of defining a spike. In other embodiments, the magnitude of the velocity depends upon a total number of exhibited zero-crossings. In still other embodiments, the magnitude of the velocity is estimated by applying a Fourier transformation to a function modeled from a portion of the response spectrum. Note that in embodiments where multiple methods are utilized, outputs from each method may be weighted and averaged in order to estimate speed.

Referring again to FIG. 3, data comprising vibrational signals may be written to a local memory source 326 before being provided as input to the response spectrum analysis module 334. In one embodiment, the response spectrum analysis module 334 is adapted to analyze the data in order to estimate the speed of the input device. In other embodiments, the data comprising vibrational signals is directly written to the memory 312. In still other embodiments, the data comprising vibrational signals is stored in external memory (e.g. a hard disk of the computer 106) and the input device transmits raw data to the computer 106 for processing.

Also note that even though FIG. 3 depicts the response spectrum analysis module 334 as being disposed within the speed detection module 330, this is not strictly necessary according to some embodiments of the present invention. Additionally, one or more separate modules may comprise at least a portion of the logic necessary for analyzing the provided data. For example, in some embodiments, the force sensor 322 provides raw data to the data integration module 314. The data integration module 314 comprises any logic necessary for response spectrum analysis.

According to some embodiments, data generated from the direction detection module 320 and from the speed detection module 330 is then provided to the data integration module 314. The data integration module 314 synthesizes the data in order to determine the velocity and/or position of the input device 102. In alternative embodiments, the data integration module 314 may be located in either the input device 102 or the receiving device 106.

In some embodiments, the data provided to the data integration module 314 comprises calculated speeds of the input device 102. In other embodiments, the data comprises one or more signals extracted from a response spectrum. According to embodiments where the direction detection module 320 is adapted to provide the data integration module 314 with an estimate of speed independent from the estimate of speed provided by the speed detection module 320, these estimates may be weighted and/or averaged according to a predetermined set of criteria.

According to some embodiments, the estimate of speed generated by the speed detection module 330 is obtained by combining vibration and acceleration information across different frequency domains. Note that the frequency dependence of the input device 102 may depend upon its housing (input device body), the sensor response, the type of motion exhibited, the surface 104, and the sliding speed.

In certain input devices 102 comprising ADXL203 accelerometers, for example, experimental vibration response measurements have indicated vibration peaks at approximately 1000 Hz and 5000 Hz. Data generated from these experiments indicate that the 5000 Hz peak is sensitive to high sliding speeds and has a better signal-to-noise ratio, while the 1000 Hz peak has a much higher sensitivity at lower speeds, but saturates (i.e. becomes non-linear) at higher speeds. Thus, according to some embodiments of the present invention, a combination of peaks or signals is utilized in order to optimize sliding speed prediction. In many cases, synthesizing data in this manner also yields a larger domain of detectable dynamic motion.

It has also been observed that the input device 102 can become dominated by certain "stick-slip" phenomena while operating at lower speeds. Stick-slip refers to surfaces alternating between sticking to each other and sliding over each other, and is often the result of friction varying with applied force. Typically, the static friction coefficient between two surfaces is larger than the corresponding kinetic coefficient. If an applied force is large enough to overcome static friction, then the input device 102 will suddenly move forward, or "slip." During the course of this motion, the frictional coefficient will decrease from its static value to its kinetic value, while the amount of applied force will also decrease. Once the applied force is no longer able to overcome kinetic friction, the input device 102 will stop moving, or "stick," while the applied force then increases. The resulting pattern of movement often resembles a series of small steps of "jerks" across a surface 104.

In the present context, small steps or "jerks" are observed as sharp, quick spikes in the acceleration data. According to some embodiments, these "jerks" are detected by applying a root mean square level to the acceleration data recorded over 72-millisecond intervals. At very low speeds, this provides the best estimate of the overall displacement of the input device 102.

Figure 7:
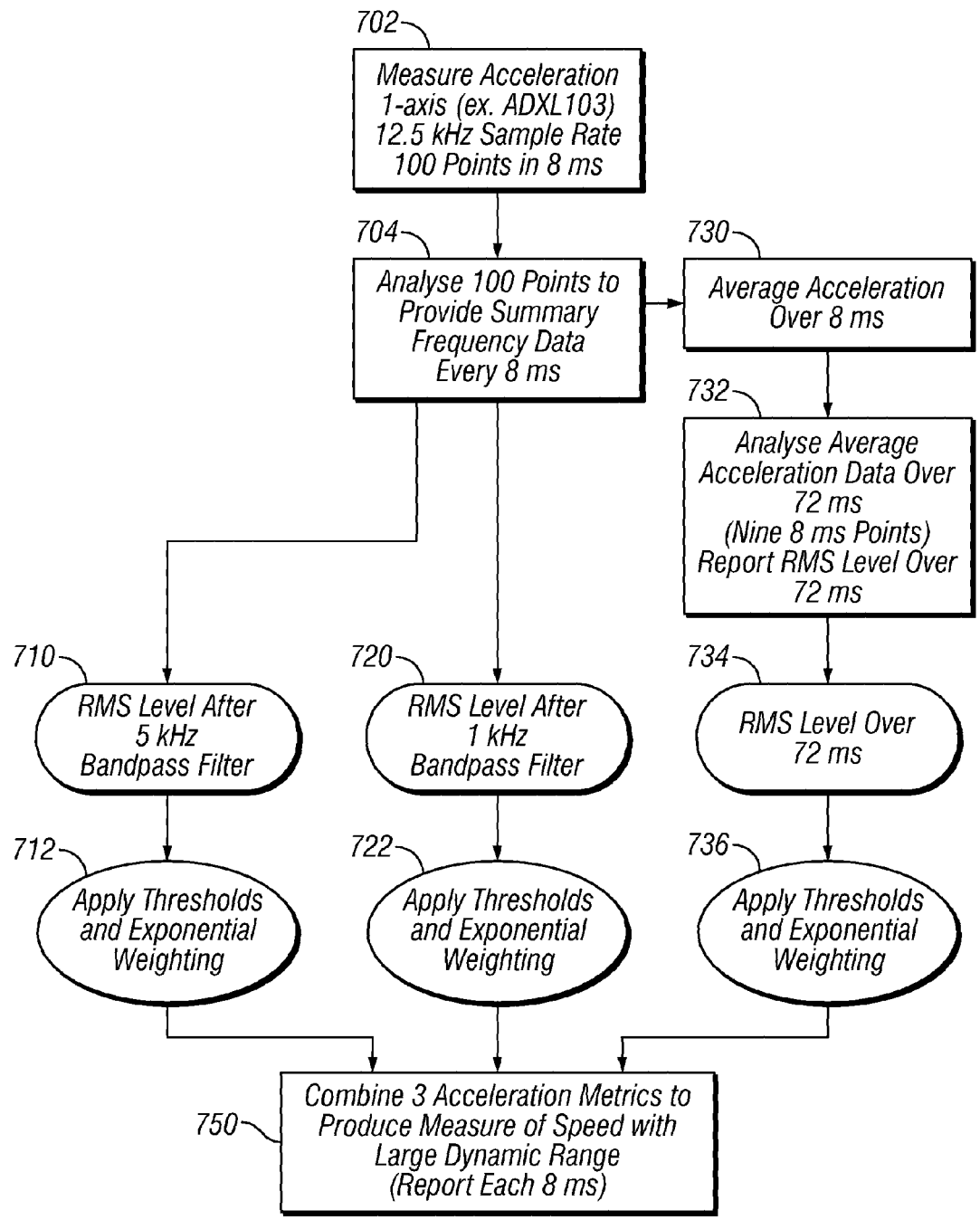
FIG. 7 is flow diagram illustrating a method of combining acceleration metrics according to one embodiment of the present invention.

FIG. 7 is flow diagram illustrating one method of combining acceleration metrics according to one embodiment of the present invention. At step 702, acceleration is measured about a given axis. In one embodiment, a 12.50 kHz sample rate of a hundred points is taken over eight millisecond intervals.

After sampling, three acceleration metrics are then calculated and analyzed. First, at step 710, a root mean square level is calculated after applying a 5 kHz bandpass filter to the received signal. Second, at step 720, a root mean square level is calculated after applying a 1 KHz bandpass filter to the signal. Third, at steps 730-734, the average acceleration over an eight millisecond period is determined and analyzed, and a root mean square level is calculated over a 72 millisecond interval.

In each of the three cases, thresholds and exponential weighting are applied to each of the respective results. This is shown at steps 712, 722, and 736, respectively. Note that any thresholds and method of weighting known in the art may be used in accordance with various applications and embodiments of the present invention. The three determined metrics are then combined at step 750 and reported every eight milliseconds, in accordance with one embodiment of the invention.

The synthesis procedures described above advantageously mitigate the effects of errors in velocity detection. For example, if the direction detection module 320 erroneously indicates a non-zero velocity during a time when the input device was stationary, this error may be corrected upon synthesizing data from the direction detection module 320 with data from the speed detection module 330. In this manner, unwanted cursor drift can be minimized and/or eliminated. Note also that data synthesis may be conducted by one module or distributed across multiple modules according to various embodiments of the present invention.

Once the direction and magnitude of the velocity have been ascertained, cursor position may then be updated in any number of ways. The logic for updating cursor position may be comprised entirely within the input device 102, within one or more remote devices (such as the computer 106), or distributed across multiple devices according to various embodiments of the present invention.

Figure 8:
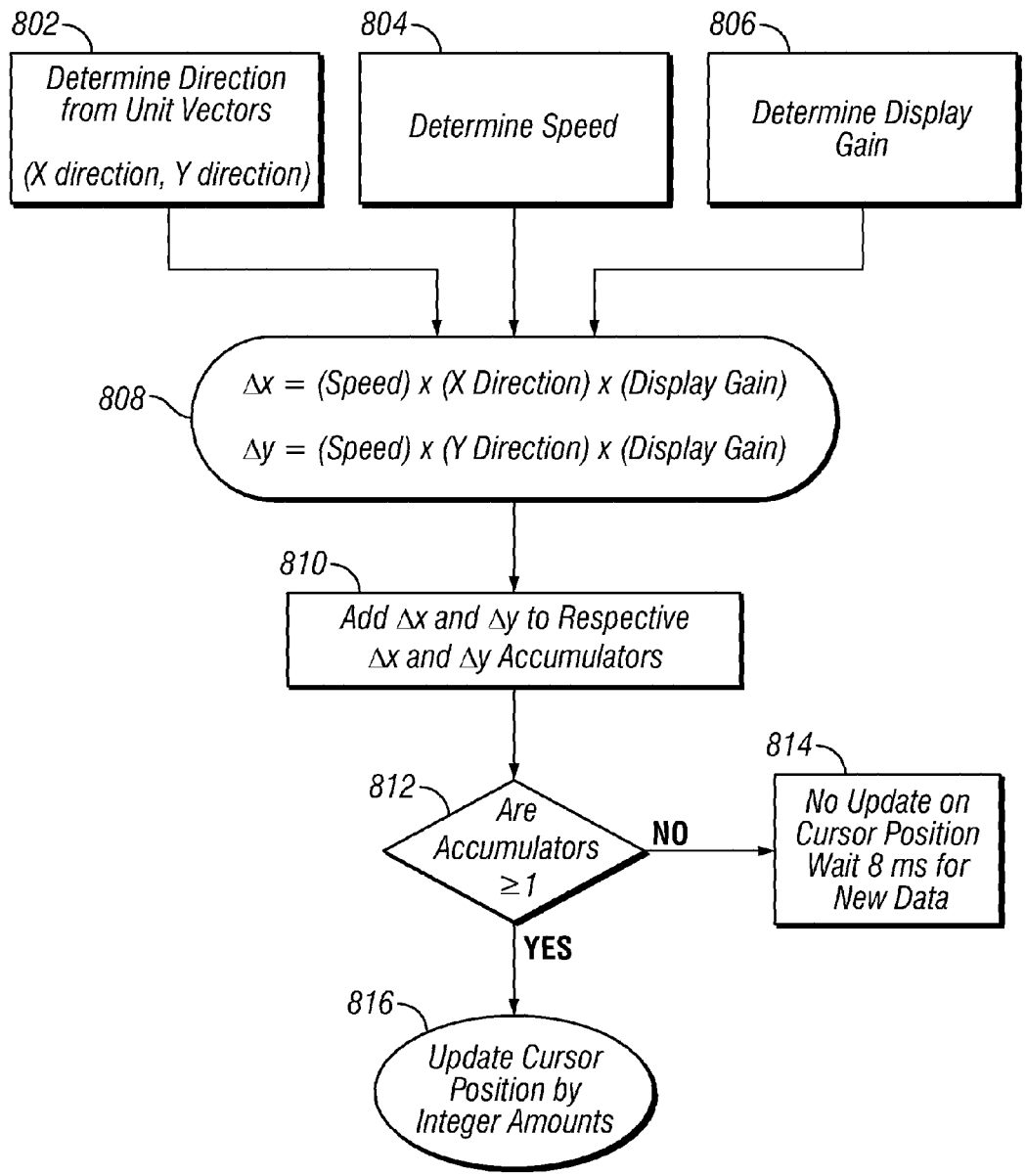
FIG. 8 is a flow diagram illustrating a method of updating cursor position according to one embodiment of the present invention.

FIG. 8 is a flow diagram illustrating a method of updating cursor position according to one embodiment of the present invention. Direction and magnitude of velocity (i.e. speed) are initially determined at steps 802 and 804, respectively. Additionally, a display gain is determined at step 806. The display gain comprises a multiplier that is used for correlating the speed of the input device 102 to a desired cursor speed. In this respect, a low gain corresponds to a large movement of the input device 102 that triggers a small amount of cursor displacement, while a high gain corresponds to a small movement of the input device 102 that triggers a large amount of cursor displacement.

Note that in certain embodiments, other types of non-linear gains are utilized in addition to, or in lieu of, the aforementioned display gain (for example, "acceleration curves" traditionally applied by a computer 106 and its operating system). However, for purposes of the embodiment depicted by FIG. 8, these gains are treated as being external to the updating algorithm.

In some display devices, cursor updating comprises calculating a separate change in pixels per each dimension of the display navigable by the user. For example, in an application for use on a standard two-dimensional computer monitor where the cursor can move both horizontally (i.e. parallel to the x-axis) and vertically (i.e. parallel to the y-axis), two separate change values are calculated for each update of the cursor. Note that even though the following discussion assumes cursor updating on a two-dimensional display, the invention is not strictly limited to two-dimensional displays. In fact, the same principles are readily extendible to three-dimensional displays and even n-dimensional displays according to the scope of the present invention.

After direction, speed, and display gain have been ascertained, the positional change in x and the positional change in y can then be determined at step 808. In one embodiment, the positional change in x is given as the product of the magnitude of the velocity, the determined X direction unit vector, and the calculated display gain. Likewise, the positional change in y is given as the product of the magnitude of the velocity, the determined Y direction unit vector, and the calculated display gain.

According to one embodiment, cursor position is updated by integer amounts (i.e. a non-fractional number of pixels on the screen). However, additional techniques may be employed in order to register input device movement in an amount of less than one pixel. For example, in some embodiments, the positional change value of x and the positional change value in y are stored in separate modules adapted to store fractional movement (e.g., accumulators). This is shown in block 810. Advantageously, these modules retain their fractional component for use during subsequent cursor update periods.

For example, suppose a user moves the input device a distance equivalent to 1.5 pixels during the period of a first cursor update. In the embodiments described above, where the cursor may be updated by integer values, the position of the cursor on the display will move to the right by 1 pixel. However, the fractional residue (0.5) is retained in the x accumulator for use during the subsequent update period. Thus, in the next update period, if the user moved the input device a distance equivalent to another 1.75 pixels, the cursor this time will move to the right by two pixels (1.75+0.5=2.25) with 0.25 stored in the accumulator for the next cursor update period.

Blocks 812-816 best illustrate this process. At decision block 812, the system determines whether the value in an accumulator is greater than or equal to one. Note that in some embodiments where a signed value is used to indicate direction, logic adapted to calculate an absolute value is also utilized. In other embodiments, the values stored in one or more accumulators are compared against a negative value (i.e., negative one). If the condition in block 812 is not satisfied, no update to the cursor is necessary for that update period. This is shown at block 814. Otherwise, if the condition in block 812 is satisfied, the cursor position is updated at block 816.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. An input device, comprising:
   a first module for detecting vibrations as the input device is moved across a surface, wherein the first module outputs a first signal corresponding to the detected vibrations;
   a second module for storing data corresponding to the first signal; and
   a third module for estimating a speed of the input device based on a first filtered signal, a second filtered signal, and a third filtered signal generated in parallel,
   wherein the first filtered signal is generated by applying a first bandpass filter to the first signal, the second filtered signal generated by applying a second bandpass filter to the first signal, and the third filtered signal is generated by averaging the first signal over a period of time, and
   wherein the first bandpass filter filters the first signal according to a first frequency band, the second bandpass filter filters the first signal according to a second frequency band, and the second frequency band is at least partially different than the first frequency band.

2. The input device of claim 1, wherein the first module comprises a vibrometer.

3. The input device of claim 1, wherein the first module comprises an accelerometer.

4. The input device of claim 1, wherein the third module is adapted to estimate the speed of the input device by processing at least one filtered signal.

5. The input device of claim 4, wherein said processing the at least one filtered signal comprises measuring the amplitude of the at least one filtered signal.

6. The input device of claim 5, wherein said measuring the amplitude of the at least one filtered signal comprises taking a root mean square level of the at least one filtered signal.

7. The input device of claim 5, wherein said measuring the amplitude of the at least one filtered signal comprises taking an absolute value of the at least one filtered signal.

8. The input device of claim 1, wherein the third module is adapted to estimate the speed of the input device by processing a plurality of acceleration metrics; wherein at least one of the metrics is based at least in part upon a measured amplitude of a filtered signal.

9. The input device of claim 8, wherein the third module is further adapted to assign a weight to each acceleration metric of the plurality.

10. A method of tracking a motion of an input device comprising:
    estimating a velocity of the input device based upon a first set of data and a second set of data; and
    positioning a display object based at least in part upon said velocity,
    wherein the first set of data is based at least in part upon a sensory value, and the second set of data comprises a first signal corresponding to vibrations associated with the input device moving across a surface;
    filtering the first signal with a first bandpass filter and a second bandpass filter in parallel, wherein the first bandpass filter filters the first signal according to a first frequency band, the second bandpass filter filters the first signal according to a second frequency band, and the second frequency band is at least partially different than the first frequency band;

determining an average of the first signal over a period of time, and estimating the velocity of the input device based on the output of the first bandpass filter and the second bandpass filter and the average of the first signal over the period of time.

11. The method of claim 10 further comprising detecting the vibrations using an accelerometer disposed within the input device.

12. The method of claim 11, wherein the accelerometer comprises a micro electro-mechanical system.

13. The method of claim 10 further comprising detecting the vibrations using a vibrometer disposed within the input device.

14. The method of claim 10 further comprising detecting the vibrations using a microphone disposed within the input device.

15. The method of claim 10 further comprising detecting the sensory value using a two-dimensional force sensor.

16. The method of claim 10, wherein said positioning a display object comprises updating a set of coordinates associated with the display object.

17. A method of tracking a motion of an input device comprising:

estimating a velocity of the input device based upon a first set of data and a second set of data; and positioning a display object based at least in part upon said velocity, wherein the first set of data is based at least in part upon a sensory value, and the second set of data comprises a first signal corresponding to vibrations associated with the input device moving across a surface;

filtering the first signal with a first bandpass filter and a second bandpass filter in parallel, wherein the first bandpass filter filters the first signal according to a first frequency band, the second bandpass filter filters the first signal according to a second frequency band, and the second frequency band is at least partially different than the first frequency band; and estimating the velocity of the input device based on the output of the first bandpass filter and the second bandpass filter, wherein said positioning a display object comprises updating a set of coordinates associated with the display object, and wherein said updating a set of coordinates associated with a display object comprises storing a fractional residue in an accumulator.

18. A computer readable storage device storing computer executable instructions which, when executed by a computer, performs a process comprising:

receiving a signal generated by a vibration sensor indicative of contact with a surface; and determining a speed of the input device based at least in part upon the signal, including:

filtering the signal through a first bandpass filter and a second bandpass filter in parallel, wherein the first bandpass filter filters the signal according to a first frequency band, the second bandpass filter filters the signal according to a second frequency band, and the second frequency band is at least partially different than the first frequency band and determining an average of the first signal over a period of time.

19. The computer readable storage device of claim 18, wherein the process further comprises:

receiving an input from a force sensor; and updating a set of coordinates based at least in part upon the input and based at least in part upon the signal.

20. The computer readable storage device of claim 19, wherein the input comprises an indication of direction.

21. The computer readable storage device of claim 19, wherein the input comprises an estimate of speed.

22. The computer readable storage device of claim 19, wherein said updating a set of coordinates is adapted to orient a graphical object upon a display screen.

23. The computer readable storage device of claim 18, wherein the vibration sensor comprises a vibrometer.

24. The computer readable storage device of claim 18, wherein the vibration sensor comprises an accelerometer.

25. A system comprising:

an input device adapted to interact with a surface;

a computing device adapted to receive a signal from the input device; and a graphical object adapted to respond to a command issued by the computing device, wherein the signal comprises a value representing a speed of the input device, in which the value is determined at least in part based upon a vibration induced by the input device moving upon a surface and wherein the value is determined by:

filtering a measurement signal corresponding to the vibration with a first bandpass filter and with a second bandpass filter in parallel, wherein the first bandpass filter filters the measurement signal according to a first frequency band, the second bandpass filter filters the measurement signal according to a second frequency band, and the second frequency band is at least partially different than the first frequency band; and determining an average of the measurement signal over a period of time.

26. The system of claim 25, wherein the input device comprises a computer mouse.

27. The system of claim 25, wherein the computing device comprises a console.

28. The system of claim 25, wherein the graphical object comprises a cursor.

* * * * *